United States Patent
Doman et al.

(10) Patent No.: US 7,072,911 B1
(45) Date of Patent: Jul. 4, 2006

(54) SYSTEM AND METHOD FOR INCREMENTAL REPLICATION OF CHANGES IN A STATE BASED DISTRIBUTED DATABASE

(75) Inventors: Thomas E. Doman, Pleasant Grove, UT (US); Steven S. McLain, Provo, UT (US); Duane F. Buss, West Mountain, UT (US)

(73) Assignee: Novell, Inc., Provo, UT (US)

( * ) Notice: Subject to any disclaimer, the term of this patent is extended or adjusted under 35 U.S.C. 154(b) by 480 days.

(21) Appl. No.: 10/202,518

(22) Filed: Jul. 24, 2002

Related U.S. Application Data

(60) Provisional application No. 60/308,451, filed on Jul. 27, 2001.

(51) Int. Cl.
*G06F 12/00* (2006.01)

(52) U.S. Cl. .................. 707/201; 707/200; 707/203
(58) Field of Classification Search ............ 707/1–203; 709/203–210
See application file for complete search history.

(56) References Cited

U.S. PATENT DOCUMENTS

| | | | | |
|---|---|---|---|---|
| 5,455,932 A * | 10/1995 | Major et al. | ................ | 711/162 |
| 5,588,147 A | 12/1996 | Neeman et al. | ................ | 707/7 |
| 5,613,079 A | 3/1997 | Debique et al. | ............ | 711/741 |
| 5,761,417 A * | 6/1998 | Henley et al. | ............... | 709/231 |
| 5,787,247 A | 7/1998 | Norin et al. | ................ | 709/220 |
| 5,787,442 A | 7/1998 | Hachert et al. | ............. | 707/201 |
| 5,794,253 A | 8/1998 | Norin et al. | ................ | 707/203 |
| 5,805,821 A * | 9/1998 | Saxena et al. | ............... | 709/231 |
| 5,812,793 A | 9/1998 | Shakib et al. | ................ | 709/201 |
| 5,819,272 A | 10/1998 | Benson | ........................ | 707/8 |
| 5,832,225 A | 11/1998 | Hacheri et al. | ............. | 709/223 |
| 5,832,487 A | 11/1998 | Olds et al. | ..................... | 707/70 |
| 5,832,514 A | 11/1998 | Norin et al. | ................. | 707/202 |
| 5,893,116 A | 4/1999 | Simmonds et al. | ......... | 707/201 |
| 5,950,198 A | 9/1999 | Falls et al. | ..................... | 707/8 |
| 5,956,489 A | 9/1999 | San Andres et al. | ........ | 709/221 |
| 6,047,312 A | 4/2000 | Brooks et al. | .............. | 709/203 |
| 6,049,809 A | 4/2000 | Raman et al. | .............. | 707/203 |
| 6,061,740 A | 5/2000 | Ferguson et al. | ........... | 709/246 |
| 6,202,085 B1 * | 3/2001 | Benson et al. | .............. | 709/205 |
| 6,247,135 B1 * | 6/2001 | Feague | ........................ | 713/400 |
| 6,295,541 B1 * | 9/2001 | Bodnar et al. | .............. | 707/203 |

(Continued)

*Primary Examiner*—Luke S Wassum
*Assistant Examiner*—Linh Black
(74) *Attorney, Agent, or Firm*—Haynes and Boone, LLP

(57) ABSTRACT

A system and method is presented for incremental replication of changes in a state based distributed database synchronization system. If a destination server has one previously established yet unsatisfied synchronization point, a starting synchronization point is formed by extracting the unsatisfied synchronization point from the destination server, identifying a type identifier within the extracted unsatisfied synchronization point identifying a predetermined set of synchronization algorithms and an execution order thereof, identifying a current key within the extracted unsatisfied synchronization point which indicates one of the predetermined set of synchronization algorithms to be started for execution, and adjusting a target state of the destination server to one older than or equal to an established target state specified by the extracted unsatisfied synchronization point. If the destination server has provided no synchronization point, the starting synchronization point is generated by a source server indicating its desired type identifier, target state, and current key.

53 Claims, 5 Drawing Sheets

U.S. PATENT DOCUMENTS

| | | |
|---|---|---|
| 6,363,389 B1 * | 3/2002 | Lyle et al. .................. 707/100 |
| 6,412,017 B1 * | 6/2002 | Straube et al. .............. 719/313 |
| 6,427,173 B1 * | 7/2002 | Boucher et al. ............ 709/238 |
| 6,438,538 B1 * | 8/2002 | Goldring ........................ 707/3 |
| 6,480,862 B1 * | 11/2002 | Gall .............................. 707/3 |
| 6,704,778 B1 * | 3/2004 | Horman ...................... 709/220 |
| 6,807,581 B1 * | 10/2004 | Starr et al. ................. 709/250 |
| 6,810,405 B1 * | 10/2004 | LaRue et al. ............... 707/201 |
| 2001/0039629 A1 * | 11/2001 | Feague ....................... 713/400 |
| 2003/0005342 A1 * | 1/2003 | Thomas et al. ............. 713/400 |

* cited by examiner

SYSTEM AND METHOD FOR INCREMENTAL REPLICATION OF CHANGES IN A STATE BASED DISTRIBUTED DATABASE

CROSS REFERENCE

The present disclosure claims the benefits of U.S. Provisional Patent Application Ser. No. 60/308,451 which was filed on Jul. 27, 2001.

BACKGROUND

The present disclosure relates to data replication or synchronization, and more particularly, to a system and method for incremental replication of changes in a state based distributed database synchronization system.

Replication or synchronization refers to a process by which data existing on a server is transferred to another server and kept consistent with the originals. Various methods of replication have been proposed. One such proposal includes a store and forward method of replication in which each server keeps track of locally made changes to a particular copy of a data set (sometimes referred to as a "replica"), which contains one or more data objects. Each server periodically broadcasts the new locally made changes (since the last replication broadcast) to all other related servers. Such locally made changes may include the creation of new data, modification of existing data, or deletion of existing data. The group of other servers also having a copy of the data set is kept on a "replica list." The changes are preferably broadcast in the form of updated copies of the changed data. This allows each server to update its local copy of the data set as changes are received by replacing the older data with the newer data. In order to keep the replicas of a given data set consistent, a transaction log may be used. The transaction log keeps track of every transaction or modification that occurs on the data set, and when replication occurs, the transaction logs are sent to various destination servers to execute such transactions.

Certain limitations exist through the use of the transaction log for data replication. For example, every little change that occurs to an object must be kept in the transaction log, and as the amount of data increases and/or the rate of change becomes large, using the transaction log is inefficient to keep the data to be replicated consistently. In other words, this method does not scale well as the size and rate of change of the data increases. In addition, predefined time windows are needed in order to clear old messages, and thus large transaction queues are created for the replication process, which may cause significant latency of replication when new changes are made to objects in the database system. As the distributed database system gets bigger and bigger, replications of large numbers changes to objects demand a serious consideration since all changes need to be successfully synchronized efficiently to assure the reliability and integrity of the system. As an alternative, a state based replication system can be used in which only the current states of the objects are sent during replication, not every transaction related to the objects. However, a purely state based system may require that all replica servers communicate with each other to synchronize changes made on their replicas. A "transitive" synchronization method wherein each replica server is informed about the state of the other replica servers, allows changes from one replica to be passed through another replica server to a destination replica without the original source server itself having to directly synchronize the change to every destination replica. However, any state based replication method, transitive or not, fails to define an appropriate mechanism for dealing with large numbers of changes in a large data set. For example, assuming a 10 million object partition is being added to a Server A, and Server B is replicating these 10 million objects to Server A, if a transport error or any other error disrupts this replication process, Server B will have to restart the replication process all over again from the first object because Server B is synchronizing a specific state, not individual transactions. This obviously does not meet the needs of a scalable distributed database system.

Therefore, what is needed is a process for incremental replication of changes in a state based distributed database synchronization system that overcomes the limitations and complexities described above.

SUMMARY

In response to these limitations, a system and method for incremental replication of changes in a state based distributed database synchronization system is presented. Such a distributed database synchronization system has at least one source server initiating the incremental replication of a partition and one or more destination servers receiving information sent by the source server. The source server first determines a replication state of the destination server. If the destination server has one previously established yet unsatisfied synchronization point, a starting synchronization point is formed by extracting the unsatisfied synchronization point from the destination server, identifying a type identifier within the extracted unsatisfied synchronization point identifying a predetermined set of synchronization algorithms and an execution order thereof, identifying a current key within the extracted unsatisfied synchronization point which indicates one of the predetermined set of synchronization algorithms to be started for execution, and adjusting a target state of the destination server to one older than or equal to an established target state specified by the extracted unsatisfied synchronization point. If the destination server has provided no synchronization point to the source server, the starting synchronization point is generated by the source server indicating its desired type identifier, target state, and current key. In either case, the incremental replication of the objects is started according to the starting synchronization point, and the incremental replication for the destination server is completed when the target state therein is reached.

The method and system disclosed in the present disclosure thus enjoys several advantages. For example, incremental replication utilized in a state based distributed database environment that does not exclude multi-master replication overcomes various scalability issues. Further, synchronization points are utilized which provide for various advantages such as the ability to reestablish a synchronization cycle without re-sending or re-analyzing objects for an established window range, the ability to support the distributed consistent ordering of synchronization elements, and the ability to halt the synchronization at any time whether it occurs by an error, command or design. The present disclosure thus provides an improved method and system for incrementally synchronizing changes with other destination servers for a given partition or gracefully recovering from errors encountered during a prior synchronization cycle.

BRIEF DESCRIPTION OF THE DRAWINGS

FIG. 1 depicts a distributed network system with replica servers exchanging information there between.

DETAILED DESCRIPTION

Figure 1:
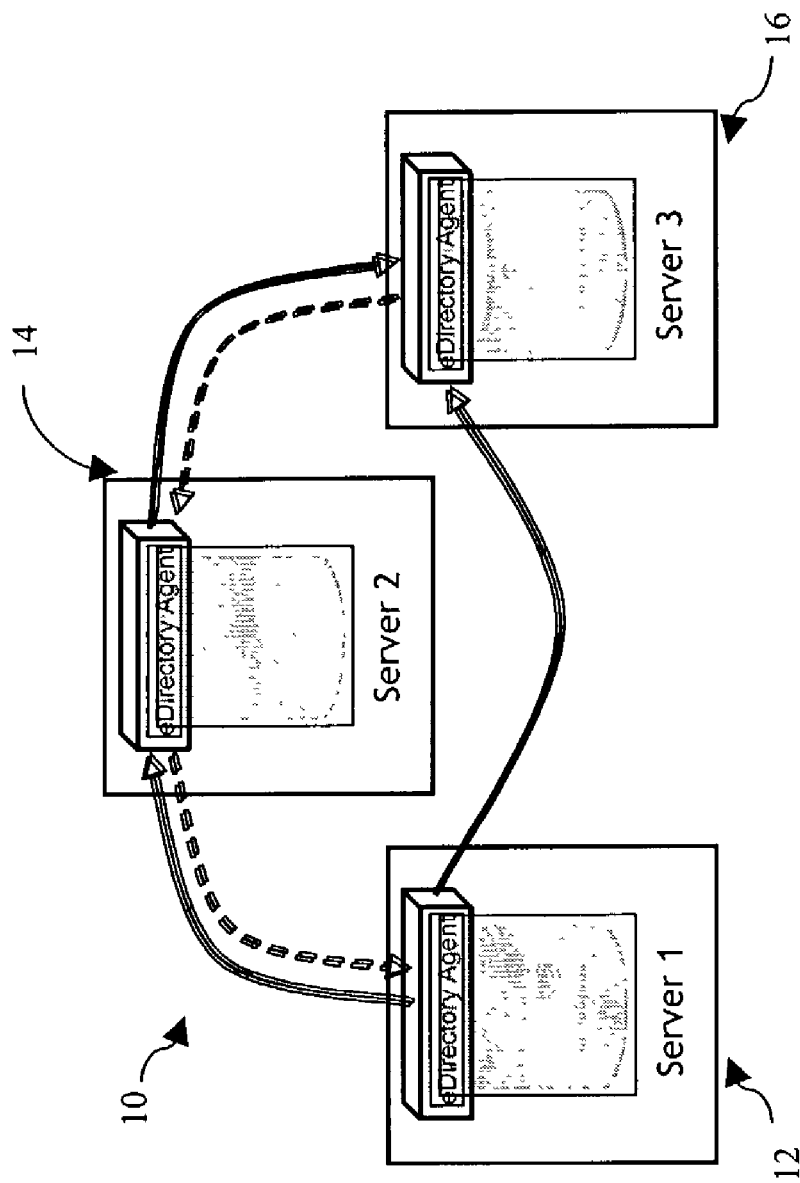

For the purposes of the present disclosure, various definitions for specific terms used are listed below. It is understood that incremental synchronization or replication involves data units, which may be referred to generically as synchronization elements. Synchronization elements are the smallest data units, for the purpose of synchronization, commonly agreeable by two or more participating servers. For example, the synchronization elements may be objects or attributes of an object. In the following description of the present disclosure, it is assumed that when the present disclosure is described in the context of "objects," it is equally applicable to attributes or other data items.

Agent/Replication Agent—An executing service on a server responsible for an area of replication (including one or more replicas).

Destination Server or Destination Replica—A server on which changes to the objects are instructed to be applied according to the instructions of a Source Replica.

Fractional Replication—A replica type that allows for filtering of objects and/or attributes thereof so that only the desired objects and/or attributes are available and maintained by that replica.

GUID —A Globally Unique Identifier. This identifier is only guaranteed to be statistically unique.

Master\Slave Replication—A replicated environment in which only a single replica (the master) allows an object to be changed and then transmitted to other replicas (slaves).

Multi-Master Replication—A replicated environment in which multiple copies of a replica are allowed to apply changes to an object, possibly simultaneously to other replicas. Convergence to a common view of the object occurs over time.

Objects—Data units containing a collection of attributes with their associated values.

Outbounding Agent—A replication agent that is in the process of transmitting changes to other replica agents, which have not seen those changes.

Partition—A distinct logical portion of a database system that stores and replicates data.

Replica—A single physical instance of a partition.

Replica Ring—A set of agents that hold a replica of a given partition and, therefore, participate in the synchronization process.

Replication Agreement—A configured agreement between two or more agents to replicate changes that they received into their respective copies of data objects.

Replica Server—An agent holding a replica of at least one partition such as a computer server.

Replica Server Configuration—A set of information describing a replica server, including but not limited to the following: state (potentially transitive) information, replication agreements, the administrative options that have been set for replication, the replica type (such as readable, writeable, fractional, etc.) and replica state (such as "on," "new," "dead," "splitting," "joining," etc.), agent versions, supported protocols, transports, and supported synchronization point types.

Replication—A process by which copies of objects existing on one replica server are created and/or updated on other replica servers in the network.

Replication Set—A subset of objects in a replica that are to be considered for replication.

Source Server or Source Replica—A server from which changes to the objects are initially generated or to be provided to a destination replica.

State Based Distributed Database Synchronization System—A distributed database system having one or more databases synchronized together using a state based anchoring mechanism.

Transaction Log—A log that chronicles database modification events such as create, delete, and modify operations that have been successfully committed to the database.

Transitive Information—The state of the data that a replica server or set of replica servers have seen. Transitive Synchronization—A replication strategy whereby not all destination servers are required to transmit changes they have originated directly to all other replicas. Once a change from one replica has been transmitted to another replica, the receiving replica can then transmit that same change to another replica.

The present disclosure presents a method and system to synchronize one originating source server with one or more other replica servers when changes are made to data units (such as objects) in the source server. In view of today's large-scale computer networks, and their distributed architecture, there is a need for incremental replication, but the issues are complex. It should be understood that, for simplicity purposes, the following example may explain the method and system of the present disclosure in the context of only two servers, one initiating and another receiving the replication, but the same replication process may be carried out in multiple servers with multiple threads simultaneously. The one initiating the replication is referred to as a source server, and the other destination server.

FIG. 1 depicts a network 10 that includes a plurality of servers 12–16 (also referred to as replica servers where each, in turn, may act as the source server or source replica and the other as the destination server or destination replica during the synchronization process) engaging in a transitive synchronization process. In the context of database systems such as a directory system, synchronization is a complex process in which distributed objects are kept up-to-date, so that users on each server can be sure that they are accessing a consistent object and that changes to the various copies of the object will converge over time. When a source server and its peer destination servers are synchronized, the contents of a replication set are used to identify those objects that have been changed, removed or added. The most recent set of changes known to the source server that are not known to the destination server are then replicated to create a consistent object on the destination server. Various changes to the replication set on any given replica will be recognized and sent during the synchronization process. These changes include the modification of object contents, attributes, directory attributes and access rights, the addition, deletion, renaming, or moving of objects, files or directories.

In a state based synchronization model, changes to an object (e.g., Object A) may have happened in multiple time instances. A state of an object may be marked by time, but should not be limited to time. For instance, monotonically increasing version numbers may be another identifier for recognizing the different states of the object of concern. A state window or range can be defined by two unique states, and identified as, for example, the Destination Replica State (DRS) and the Source Replica State (SRS). For the synchronization purpose, such a window helps to define a unit of changes to be implemented. All changes made to Object A after the DRS must be sent out from the source replica to the destination replica during the synchronization process, regardless of whether some of those changes occurred after the initial SRS was established for the state window being synchronized. The currently committed state of each object on the source replica is always synchronized in order to ensure object consistency in all replicas. Having to follow the above described object transaction model means that any changes that occur after the SRS will be resent on the next synchronization cycle. Furthermore, any object with changes only beyond the SRS can be ignored in the current synchronization cycle and sent in the next synchronization cycle. In a conventional method, once the source replica has determined that changes need to be sent, each object in a chosen replication set is analyzed for changes made during the window between the SRS and DRS. Once the chosen replication set is exhausted, the destination replica is instructed to merge it's state with the SRS. The major problem with this conventional approach is that all changes for the entire state difference (i.e., SRS-DRS) are required to be synchronized before the destination replica is requested to merge it's state with the SRS. In the case that any accident disrupts the synchronization process before the source replica has successfully sent all changes within the desired window, all changes will have to be resent when the synchronization process is re-initiated because, other than the DRS, the source replica has no other indication of what changes the destination replica has received. Thus, all work done in the previous interrupted synchronization is lost and there is no incremental staging at all. For large replication sets, this is unacceptable since large amounts of work could be lost, thereby rendering the entire system inefficient.

One initial incremental state based synchronization solution would be simply breaking up the state difference between the DRS and SRS into smaller state based units and allowing the destination replica to merge it's state more often with intermediate states between the DRS and SRS. While it would serve as an incremental mechanism, it would be extremely inefficient since the replication set or sets under consideration for synchronization must be evaluated completely, once for each state based unit considered. Using the previous example of a 10 million-object-replica being added to Server A from Server B, Server B would have to analyze all 10 million objects for merging with every intermediate state between the DRS and the SRS. Therefore, anchoring the synchronization in these intermediate states can be problematic as well. Henceforth, a non-state based anchoring method that allows for the full state difference between the DRS and SRS (or reasonably large units thereof) to be synchronized would be the efficient way to implement an incremental synchronization mechanism in a state based synchronization system. The present disclosure describes such a mechanism while still allowing for, if needed, state based units between the DRS and SRS to be specified as well.

In order to provide a better incremental replication process, synchronization points are used which may contain elements of a state based synchronization process and a non-state based anchoring mechanism, which are disclosed in more detail below. In order to describe the method and system disclosed herein, a few terms need to be explained. First, a Distributed Consistent Ordering (DCO) of objects is an order following which synchronization elements are produced in the same sequence on every replica server that is using the same type of synchronization point. A synchronization point contains information such as the following: a type identifier (also known as a synchronization point type) which identifies a predetermined set of synchronization algorithms and the execution order thereof, a current key which indicates one of the synchronization algorithms that is currently being executed, and optionally, a nested current key or at least one synchronization element identifier corresponding to the executed algorithm, and an indication for a target state of the destination server expected to be reached upon successful completion of the current synchronization cycle. The type identifier defines a set of algorithms that are being used for synchronization that can be shared on one or more servers that replicate the same partition by implementing the specified algorithms or processes. Examples for the type identifier in a distributed database synchronization system such as the Directory System provided by Novell, Inc. of Provo, Utah may include replication sets such as Change Cache and Partition with synchronization elements possibly arranged in an order according to such attributes as a GUID or Creation Time Stamp (CTS). The current key is used as a location identifier to identify a currently executing synchronization algorithm and a point in such synchronization algorithm so that a disrupted synchronization algorithm may be resumed. As such, the current key may include a first positioning element for identifying a specific algorithm from the set of synchronization algorithms specified by the synchronization point type identifier. Furthermore, the current key may also include a second positioning element that identifies at least one synchronization element (such as an object, potentially one from a DCO) utilized by the algorithm identified by the first positioning element. The current key also allows a special structure in which a "nested" sub-level current key is embedded as the second positioning element of the current key. Such a nested structure is dictated by the needs of the identified synchronization algorithm. As any current key, this nested sub-level current key can have its own positioning elements and other similar components. This nested or embedded structure can go down level after level (until infinity) since each current key can contain another current key in order to identify an algorithm, objects, attributes, or any other synchronization elements. It is thus not unusual to have more than one current key embedded in sequence one after another starting from the "top-level" current key. The nesting structure is eventually terminated when the lowest level nested current key identifies a non-current key element (e.g. a synchronization element) or is simply not specified. The current keys associated with an established synchronization point may also be updated as the synchronization process progresses, thus providing an anchor for the incremental changes. The synchronization algorithms involved may be determined based on one or more predetermined administrative policies of the distributed data system. They may also be identified or changed based on the current replica server configuration of the destination server.

In some cases, if a synchronization algorithm is unable to establish a current key in the synchronization point, then that portion of the algorithm will not be incrementally saved and that algorithm will have to be executed from its beginning if that synchronization point is used to resume a synchronization cycle until such a current key is provided. The type of the current key is determined by the type identifier (e.g. the type of DCO being used). A synchronization process or cycle initiated by a source server can be incrementally resumed at any point of interruption since the point where the synchronization process was anchored (and therefore, where the process should be continued) is clearly identified. In fact, a synchronization point can identify a temporary "end point" from which a synchronization cycle can be stopped and resumed, thus allowing the source server to end a synchronization session based on certain administrative policy rather than the mere satisfaction of the target state. As such, once the synchronization point with its type identifier, current key, and target state is established on a destination replica, any other replica servers including the source replica (which has established the synchronization point) may "pick up" such synchronization point and re-initiate the synchronization cycle at the location specified by the synchronization point as long as such a synchronization point can be used and satisfied by such a replica server.

Each object or other synchronization element with changes in the replication set will be processed and synchronized until all the objects in the replication set have been updated, thereby satisfying the target state. This is considered to be the end of a synchronization cycle. Throughout this process, update replica requests are made as messages are filled with qualifying changes (e.g., objects with changes between the DRS and SRS) as well as the relevant current synchronization point. The message may be of a negotiated, fixed, and finite size. Since synchronization points are established and updated with each update replica request, this allows administrative policy to be specified that will allow the source replica to synchronize discrete non-state based units of work (which may also be known as window panes) instead of a complete synchronization cycle. This, again, results from the fact that once established, a synchronization point may be picked up by any other replica server allowing the synchronization cycle to be further advanced as far as that replica server is configured or willing to advance it. Examples of non-state based units of work include the number of objects analyzed, number of objects sent, time spent analyzing and sending changes, current time within a specified time range, number of bytes sent, and number of attributes sent, etc.

Figure 2:
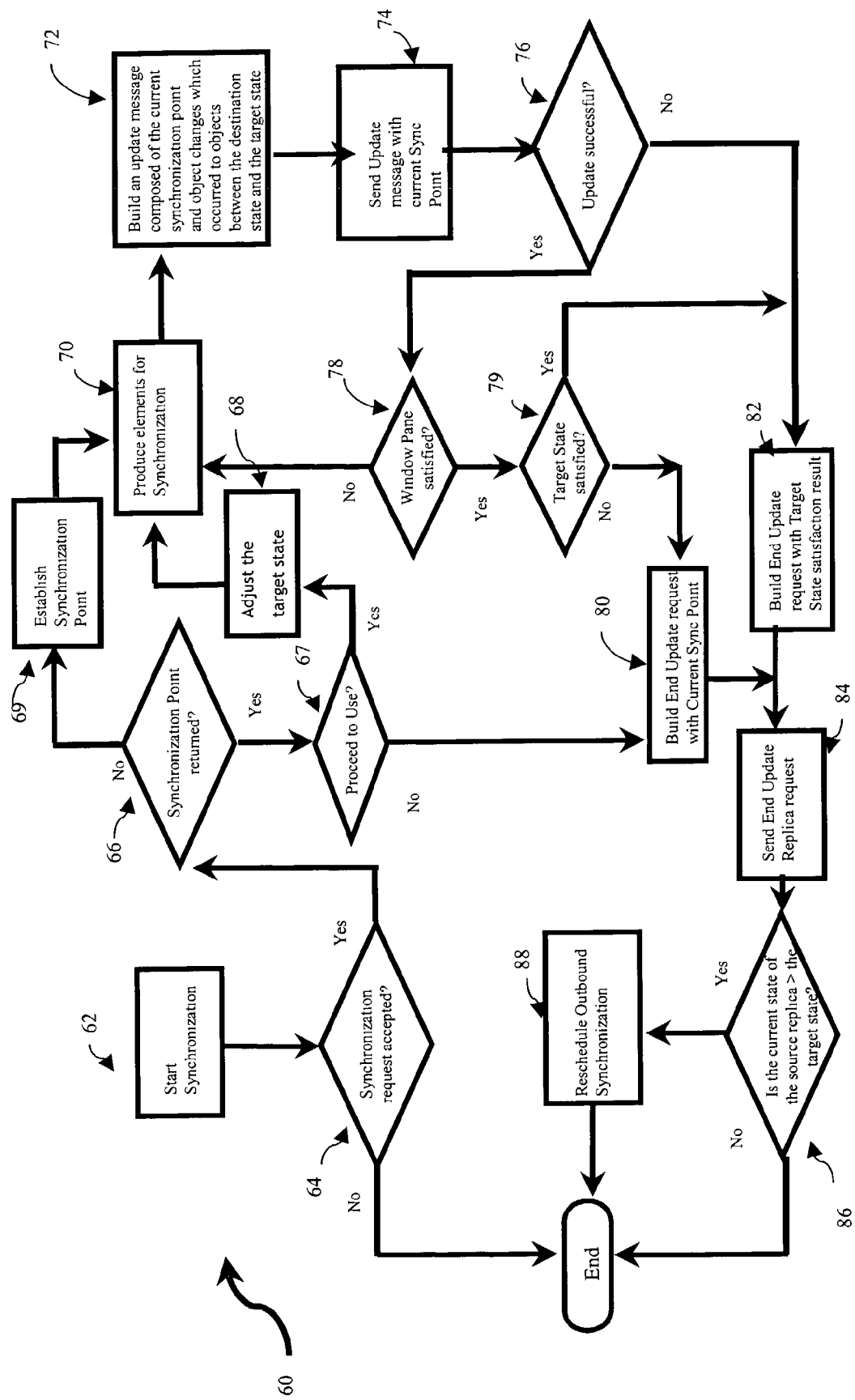
FIG. 2 depicts a flow diagram for an outbound synchronization process initiated by a source server.

FIG. 2 depicts a flow diagram 60 for an outbound synchronization process initiated by a source server. An incremental replication process between a source server and a destination server begins when, in step 62, the source server sends a start synchronization request to the destination server based on the source server's current state and the last known state of the destination server. That is, if the current state of the source server is different from the state of the destination server known to the source server, a need arises to synchronize between them. In the message, the source server provides the destination server with the types of synchronization points (identifiable by the type identifier of the synchronization point) supported by the source server. In step 64, a decision is made to determine if the destination server accepts the request. If the destination server accepts the request and processes the start synchronization request, it will send a reply back to the source server to confirm the establishment of the synchronization session there between. If the destination server does not support such synchronization (e.g., the agent on that server does not understand synchronization points), the destination server may still accept the synchronization request and the flow will proceed on the source server to step 66 and onward as shown. However, the source replica will not send synchronization points to that destination server (step 72) and thus no incremental replication can be made between these two servers. If the destination server is already synchronizing for that replica or otherwise does not wish to accept an inbound replication, an error may be returned signifying the denial of the start synchronization request. It is noted that the destination server can also refuse to synchronize with the source server based certain "discrimination criteria" such as the amount of data to be synchronized. Such synchronization discrimination criteria may be stored in an established synchronization point. On the other side, the source server can also refuse to continue the synchronization based on similar criteria. The source server may derive such criteria from any synchronization point returned (as shown in steps 66 and 67). The source server can also put synchronization constraints into a synchronization point that it sends to the destination server. For example, such constraint may ask a specific destination server to synchronize with it and only with it until the target state established in the synchronization point is fully satisfied.

In order to start the synchronization session appropriately, the source server needs to establish a starting synchronization point by either getting information from a previously established yet unsatisfied synchronization point from the destination server, or making one afresh. When the destination server receives the start synchronization request, it determines whether it has an already established synchronization point. If it has one, but the provided type identifier indicates that the source server's configuration does not support the synchronization point of the destination server, the synchronization point on the destination server is checked for its corresponding expiration time limit. If the synchronization point has expired, the synchronization point is not to be returned to the source server. The source server may then establish a new synchronization point for the destination server. The corresponding target state is then set based largely on the SRS, the DRS, and a configurable state window (or delta) that the administrator may define for the incremental replication process. If the synchronization point has not expired and is supported by the source server, the synchronization point is returned to the requesting source server. If the source server does not support the synchronization point and the synchronization point has not expired, the start synchronization request is denied by the destination server. Therefore, in step 66, a decision is made to determine if a synchronization point has been returned from the destination server.

Using the information that has been returned from the destination server, it is determined in step 67 whether the returned information is permitted or desirable to be used by the source server. A source server may be concerned with how much of the target state can be satisfied by its SRS. If the synchronization point was established by another server with a much more current state, the source server may not want to lose the work anchored by that server and therefore may refuse to continue the synchronization session, even though the destination replica has accepted it's bid to start a synchronization session. If the source server determines that it would like to use the returned synchronization point, the method proceeds to step 68 where each replica's state represented in the SRS and the target state are analyzed to produce a new target state for the synchronization point, which must be composed of the lowest or oldest values represented in each of the two states (again, the SRS and the returned target state). The returned synchronization point from the destination server is used by the source server to establish a starting point for the synchronization session, which corresponds to the ending position of the previous synchronization session. It is noted that the current key is only valid for the specified target state or a relevant older state, which is why the target state is adjusted as here described. The source server determines the new desired target state based on two different scenarios. First, since the source server cannot synchronize data or replicas that it has not yet seen, therefore, it must adjust the target state back if there are such replicas. Second, if another source server has established the synchronization point which the current source server picks up, but the current source server has seen some changes that the original source server who established the synchronization point had not seen, then the source server cannot use its current SRS for the target state. Since the source server needs to start from the current key specified in the synchronization point it picked up and it cannot be guaranteed that the original source server that established the synchronization point had the data from other replicas that it has, the current source server must therefore use the existing target state replica values for those replicas even though it could provide more changes for those replicas.

Back to step 66, if no synchronization point has been returned, a starting synchronization point is established at step 69 before the update portion (the loop formed by steps 70, 72, 74, 76, 78) of the synchronization starts. The target state is the state to which the source server intends to move the destination server, and the boundaries or the range of the target state is defined based on a predetermined window size chosen according to certain administrative policies and the DRS. As discussed above, since changes that have not been seen by the source server cannot be sent to the destination server, the window size plus the DRS should not exceed the SRS for any replica value. A synchronization point type is then chosen based on the destination server's replica configuration (and/or administratively chosen configuration), and the update portion of the synchronization process is then started at the beginning of the first algorithm specified by the chosen synchronization point type. In step 70, synchronization elements (e.g., objects and/or their attribute values) for synchronization consideration are produced based on the synchronization point, whether it was returned by the destination replica or newly established by the source replica.

Back to step 67, if the source server does not desire to use the returned synchronization point, step 80 will follow, which will be described below. At step 72, an update message is constructed composed of objects with changes that occurred between the DRS and the target state. At step 74, the update message is transmitted from the source server to the destination server containing as many changes as will fit into the message to instruct the destination server to implement the changes to the specified objects. If the source server has a new target state to specify or a new current key, it may also be sent as part of the update message. As explained above, the update message will contain all changes to a given object that have occurred after the DRS, even if some of them may have occurred after the target state. This, again, is done to maintain a logically consistent view of the object on all replica servers. Further, the source server may elect to exclude objects that are not in the window being considered, that is, objects with changes only after the target state.

On the destination server side, the update message is processed by recording any synchronization point that is received, and then the specified transactions for each object are implemented accordingly. In step 76, the destination sends and the source server receives a notification indicating whether the update message has been successfully implemented on the destination server. If it is, in step 78, it is further determined if a window pane, i.e., a predetermined non-state-based unit of work has been satisfied. The determination criteria may include but are not limited to: the number of objects analyzed, number of objects sent, number of bytes sent, number of attributes sent, time spent analyzing and sending changes, current time within a specified time range, and other measuring factors from the destination server such as processing time, load, etc. If the expected unit of work has not been done, the process returns back to step 70. If it has, step 79 further examines whether the target state has been satisfied. This update process will continue repetitively until all objects in the replication set have been exhausted, which is how the target state is satisfied.

Any time a current key is updated in the synchronization point, if a synchronization element from a DCO is specified as part of the key, that identifier must uniquely distinguish that synchronization element from either the previous synchronization element in the replication set ordered by that DCO or the synchronization element identified in the previous current key. Otherwise, the current key cannot be updated. This will avoid any potential looping conditions which might occur, however unlikely, when synchronization points are shared back and forth among servers. Or more likely, to avoid looping conditions when window panes are used whose requirements may not exceed the number of non-uniquely identifiable synchronization elements. For example, when a window pane contains 100 objects to be analyzed, which are part of 150 synchronization elements that are not uniquely identifiable in the corresponding DCO. The synchronization process would have to continue until the 151st object where a new current key could be established. If a disruption occurs during the time when a new current key cannot be specified, when the next synchronization session is established to continue the synchronization cycle, the last current key would be used which is derived from the last successfully established synchronization point.

In step 79, if the target state is not satisfied, an End Update request is built with current synchronization point in step 80. If the target state has been reached, in step 79, the destination server builds an End Update request with the result derived from the satisfied target state in step 82. In step 84, the End Update request is sent to the destination server. If the target state was satisfied, the destination server will deactivate the last synchronization point because it can now merge the DRS with the target state. In step 86, a check is made to determine whether the current state of the source replica is greater than the target state that has just been satisfied. That is, whether there have been any changes made on the source server or received from other replicas while the source server was outbounding changes to the chosen destination server. If so, a new synchronization cycle is scheduled at step 88 to replicate the latest changes, which, when executed, will begin again at step 62. As such, the synchronization process between the source server and all destination servers may be carried out iteratively until no more synchronization is needed. If, in step 86, the current state of the source server is not greater than the target state, the synchronization process ends until a new change occurs in the system.

Figure 3:
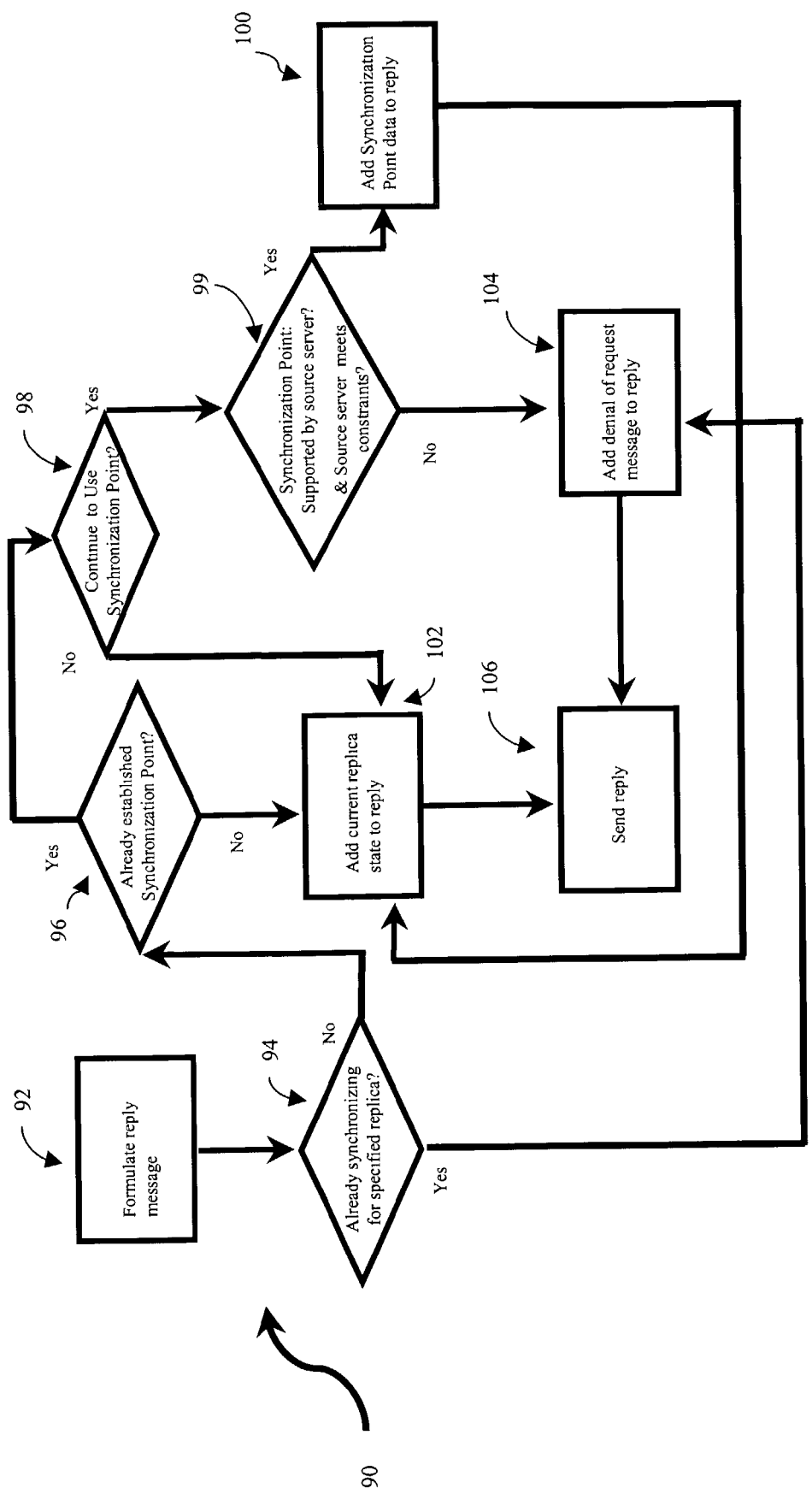
FIG. 3 depicts a flow diagram for processing a start synchronization request by a destination server.

FIG. 3 depicts a flow diagram 90 for processing a start synchronization request by a destination server. After a start synchronization request is processed, at step 92, a reply message begins its formulation and at step 94 a decision is made to determine whether the destination server is already engaging in the synchronization process. If it is not, a decision is made in step 96 to determine if a synchronization point has been established at the destination server. If, in step 94, the destination server is already engaged in a synchronization session, a denial of request is added to the reply message in step 104. If in step 96, the synchronization point has been established, the method proceeds to step 98 to determine whether the synchronization point is allowed to be used. If in step 96, no synchronization point is found to be in existence, the process moves to step 102 to add the current replica state (i.e., DRS) to the reply. In step 98, if the synchronization point can be used, a decision is made in step 99 to determine if the synchronization point is compatible with (or supported by) the source server (e.g., whether the source replica meets predetermined constraints). Otherwise, back in step 98, the process moves to step 102. Step 99 is followed by step 100 if the synchronization point is fully supported by the source replica. In step 100, the synchronization point and other related information is added to the reply message and the current replica state of the destination server is added to the reply message in step 102. If the source server does not support the synchronization point, the method proceeds to step 104 where a denial of request is added to the reply message. In step 106, the reply message is transmitted from the destination server to the source server.

Figure 4:
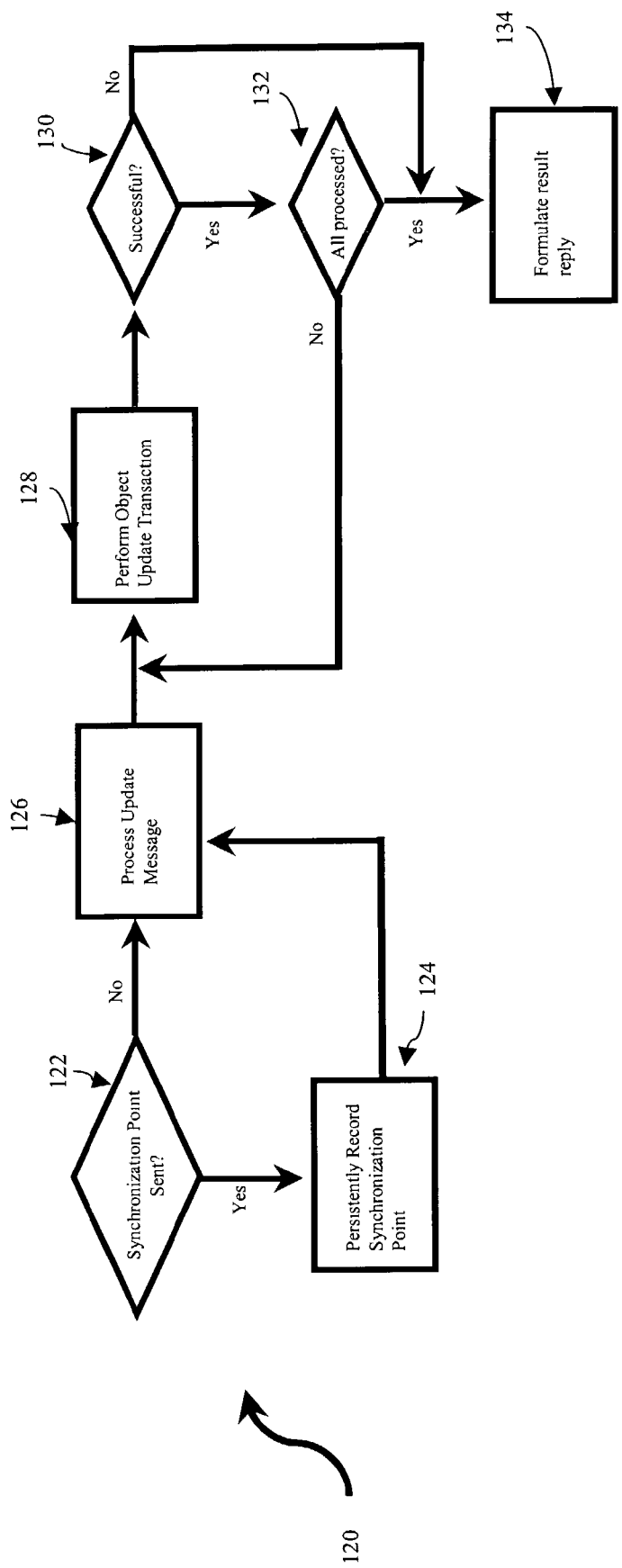
FIG. 4 depicts a flow diagram for implementing changes synchronized to a destination server.

FIG. 4 depicts a flow diagram 120 for processing an object update request message on a destination server. At step 122 a decision is made to determine if a synchronization point has been sent from the source server as a part of the update request message described in FIG. 2. If it has, the synchronization point is persistently recorded (e.g., stored in a database) at step 124 and the process proceeds to step 126. If it has not, the update message from the source server is processed at step 126, and the destination server performs object update transactions at step 128. At step 130 a decision is made to determine if an object update transaction is successful. If it is, the method proceeds to step 132 where a decision is made to determine if all of the objects in the update message have been processed. If they have not, the method proceeds to step 128 to invoke another update transaction. If all the objects have been processed, or if the object update transaction is not successful, a result (success or failure indication) reply is formulated at step 134 and sent back to the source server.

Figure 5:
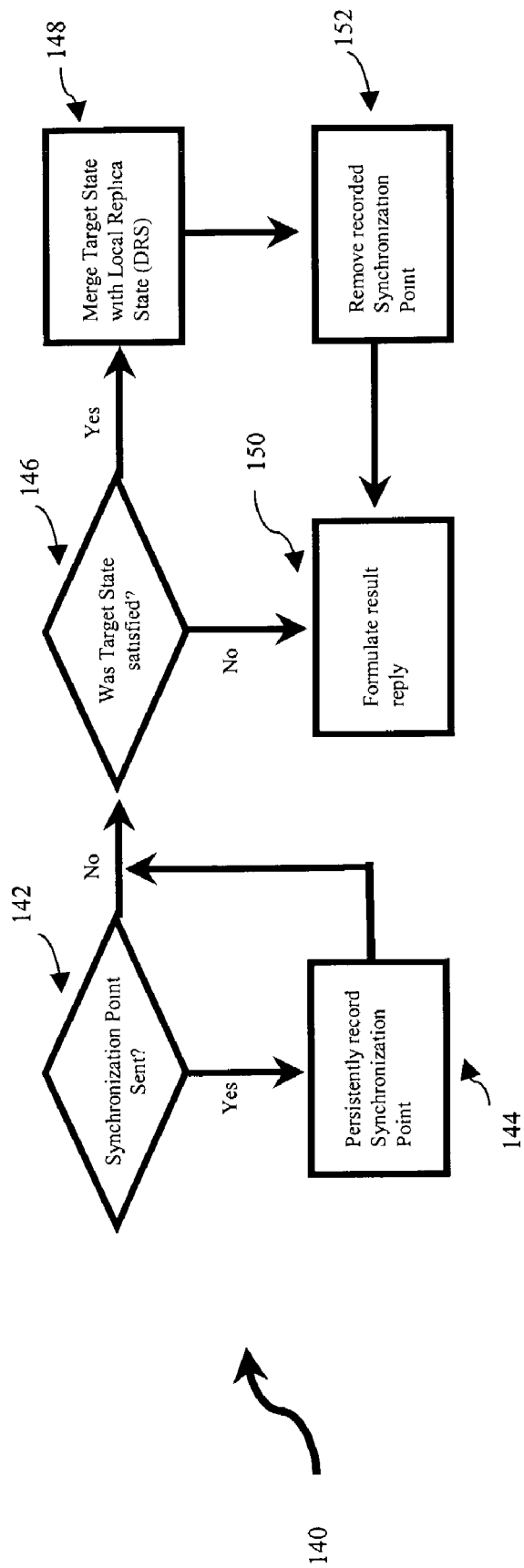
FIG. 5 depicts a flow diagram for processing an end update replica request by a destination server.

FIG. 5 depicts a flow diagram 140 for processing an end update replica request by a destination server. At step 142, a decision is made to determine if a synchronization point has been sent to the source server. If it has, the synchronization point is persistently recorded at step 144 and the method proceeds to step 146. If it has not, a decision is made to determine if a target state has been satisfied at step 146. If it has, the target state is merged with the current replica state at step 148 and the recorded synchronization point is deactivated at step 152. A result reply is formulated and sent back to the source server and indicating a "success" if the end update reply request has been processed successfully in steps 142, 144, 146, 148 and/or 152. If any of these steps fails, the result reply will also reflect such failures.

In the process of incremental replication described above, it is noted that not only a set of algorithms are specified by the synchronization point type, but the algorithms may work on objects in predetermined sets that are in a persistent order on all replica servers (e.g., DCO) as well. When the synchronization point with a current key identifying a synchronization element in a DCO is applied, the objects that are produced and considered for synchronization are in the same order on every replica server that supports such synchronization point type. That is, the ordering applied is the same on all replicas, even though the most lately created objects will not exist on every server until they are synchronized, they will be placed in the DCO in a consistent manner and processed based on the window being considered during a given synchronization cycle. However, if the order of the synchronization elements varies from one replica server to another, the synchronization point may be constrained to be used by only the server that established it. When the synchronization elements existing in an order on the source server are in a potentially different order on other replica servers, the current key associated therewith is invalid for those replica servers to use. For this purpose, the synchronization point may include a source sever identifier so that the destination server can clearly determine the source server and conform to the specified constraint. The synchronization point may also internally contain some usage parameters, which further limit the consideration of who can process it, how to process it, and whether it can be processed by a particular source replica. It should also be noted that if the elements to be considered for synchronization are not ordered in any way on a given replica server, then that server cannot establish a synchronization point whose current key contains an identifier of a synchronization element, which is used to position a continuation of the synchronization cycle as described above. This does not mean, however, that the source server cannot establish synchronization points with current keys that specify the current algorithm or nested sub-algorithms in the nested keys to achieve an anchoring mechanism for the synchronization process.

In addition, although the level of object creations, modifications, and deletions occurring in the distributed database synchronization system during a given time period may vary, this will not affect the system's ability to regularly establish synchronization points since they are not merely state or time based. Further, the above disclosed incremental replication method supports, but is not limited to, multi-master, master-slave, and fractional replication environments. Moreover, due to the use of synchronization points to identify where the synchronization process has proceeded to or stopped at, the incremental replication disclosed herein applies to any destination server or database server holding replicated objects. It thus can continue (and finish) a synchronization process where another destination server has left off (including itself) provided that the source server that picks up the synchronization point supports the specified type. A synchronization session can be intentionally or unintentionally stopped at a finite unit of work while, in the worst scenario, only losing a minimal amount of previous progress such as any update messages that do not include a synchronization point anchor. Further, the reestablishment of an abandoned or disrupted synchronization cycle through the use of a synchronization point does not require reanalysis of all related synchronization elements that have been processed before the process is abandoned or disrupted. A source server has the discretion to honor or use a given synchronization point, and if the synchronization point is not used, the source server may discard previous work. However, when the source server uses the synchronization point, once the source server has established a target state in a synchronization point, that synchronization point's target state is consistently maintained until that target state (or older) is satisfied regardless of how many other servers will participate in the synchronization cycle. Further, the state-based object transaction model described above is maintained regardless of the number of servers, failures, or window panes involved during the synchronization so that all copies converge to the same state for every object.

The present disclosure thus enjoys several advantages. For example, incremental replication utilized in a state based distributed database environment that does not exclude multi-master replication overcomes various scalability issues. For example, large numbers of synchronization elements in a set, if arranged in an order, can be specified in the current key of a synchronization point and thus provide a more granular anchor and repositioning mechanism. Further, synchronization points are utilized which provide for various advantages such as the ability to reestablish a synchronization cycle without re-sending or re-analyzing objects for an established window range (e.g., between the DRS and target state), the ability to support the distributed consistent ordering of synchronization elements, and the ability to halt the synchronization at any time whether it occurs by an error, command or design. The present disclosure thus provides an improved method and system for incrementally synchronizing changes with other destination servers for a given partition or gracefully recovering from errors encountered during a prior synchronization cycle.

It is understood that variations may be made in the foregoing without departing from the scope of the present invention. It is further understood that other modifications, changes and substitutions are intended in the foregoing disclosure and in some instances some features of the disclosure will be employed without corresponding use of other features. Additionally, singular discussion of items and/or servers located in the network is also meant to apply to situations where multiple items and/or servers exist. For example, a source server can be a destination server at the same time due to replication requests made by other servers in the network. Accordingly, it is appropriate that the appended claims be construed broadly and in a manner consistent with the scope of the disclosure.

What is claimed is:

1. A method for incremental replication of one or more changes made to at least one partition in a state based distributed database synchronization system, the distributed database synchronization system having at least one source server initiating an incremental replication session with one or more destination servers, the method comprising:
    determining, by the source server, a replication state of the destination server;
    if the destination server has one previously established yet unsatisfied synchronization point, forming a starting synchronization point by:
        extracting the unsatisfied synchronization point from the destination server;
        identifying a type identifier within the extracted unsatisfied synchronization point which identifies a predetermined set of synchronization algorithms and an execution order thereof;
        identifying a current key within the extracted unsatisfied synchronization point which indicates one of the synchronization algorithms to be started for execution; and
        adjusting a target state for the destination server to one older than or equal to an established target state specified by the extracted unsatisfied synchronization point,
    if the destination server has provided no synchronization point to the source server, generating a starting synchronization point by the source server indicating the corresponding type identifier, target state, and current key; and
    starting the incremental replication of the partition according to the starting synchronization point, wherein the incremental replication session for the destination server is completed when the target state thereof is reached.

2. The method of claim 1 wherein each current key includes a first positioning element identifying one synchronization algorithm of the predetermined set of synchronization algorithms.

3. The method of claim 2 wherein each current key includes a second positioning element identifying one synchronization element of a set of synchronization elements corresponding to the synchronization algorithm identified by the first positioning element.

4. The method of claim 3 wherein the second positioning element identifies a sub-level current key, thereby forming a nested current key structure.

5. The method of claim 3 further comprising updating each current key of the starting synchronization point sent to and saved on the destination server as the synchronization elements are processed.

6. The method of claim 3 further comprising constraining the use of the starting synchronization point by another source server if such another source server contains the synchronization elements in a different order.

7. The method of claim 3 wherein the synchronization elements are one or more smallest data units for the synchronization commonly agreeable by both the source and destination servers.

8. The method of claim 7 wherein the synchronization elements are objects.

9. The method of claim 7 wherein the synchronization elements are attributes of objects.

10. The method of claim 2 further comprising updating each current key of the starting synchronization point sent to and saved on the destination server as the synchronization algorithms are executed.

11. The method of claim 1 wherein the starting synchronization point further comprises one or more parameters indicating usage constraints.

12. The method of claim 11 wherein the parameters include at least one parameter based on which the source server or the destination server refuse to process the starting synchronization point.

13. The method of claim 1 wherein the target state is adjusted based on the current state of the destination server (DRS), the current state of the source server (SRS), and a configurable state window.

14. The method of claim 1 wherein the starting synchronization point is stored on the destination server for use in the event of intentional or unintentional interruption.

15. The method of claim 1 further comprising deactivating the starting synchronization point after the target state specified by the source server for the destination server has been reached.

16. The method of claim 1 further comprising intentionally interrupting the incremental replication at the request of the source server after it is started.

17. The method of claim 16 further comprising continuing the incremental replication after the intentional interruption.

18. Functional data on a computer-readable media for incremental replication of one or more changes made to at least one partition in a state based distributed database synchronization system, the distributed database synchronization system having at least one source server initiating an incremental replication session with one or more destination servers, the functional data comprising instructions for:
    determining, by the source server, a replication state of the destination server;

if the destination server has one previously established yet unsatisfied synchronization point, forming a starting synchronization point by:

extracting the unsatisfied synchronization point from the destination server;

identifying a type identifier within the extracted unsatisfied synchronization point which identifies a predetermined set of synchronization algorithms and an execution order thereof;

identifying a current key within the extracted unsatisfied synchronization point which indicates one of the synchronization algorithms to be started for execution; and adjusting a target state for the destination server to one older than or equal to an established target state specified by the extracted unsatisfied synchronization point, if the destination server has provided no synchronization point to the source server, generating a starting synchronization point by the source server indicating the corresponding type identifier, target state, and current key; and starting the incremental replication of the partition according to the starting synchronization point, wherein the incremental replication session for the destination server is completed when the target state thereof is reached.

19. The functional data of claim 18 wherein each current key includes a first positioning element identifying one synchronization algorithm of the predetermined set of synchronization algorithms.

20. The functional data of claim 19 wherein each current key includes a second positioning element identifying one synchronization element of a set of synchronization elements corresponding to the synchronization algorithm identified by the first positioning element.

21. The functional data of claim 20 wherein the second positioning element identifies a sub-level current key, thereby forming a nested current key structure.

22. The functional data of claim 20 further comprising updating each current key of the starting synchronization point sent to and saved on the destination server as the synchronization elements are processed during the incremental replication session.

23. The functional data of claim 20 further comprising constraining the use of the starting synchronization point by another source server if such another source server contains the synchronization elements in a different order.

24. The functional data of claim 20 wherein the synchronization elements are one or more smallest data units for the synchronization commonly agreeable by both the source and destination servers.

25. The functional data of claim 20 further comprising updating each current key of the starting synchronization point sent to and saved on the destination server as the synchronization algorithms are executed during the incremental replication.

26. The functional data of claim 18 wherein the starting synchronization point further comprises one or more parameters indicating usage constraints.

27. The functional data of claim 18 wherein the target state is adjusted based on the current state of the destination server (DRS), the current state of the source server (SRS), and a configurable state window.

28. The functional data of claim 18 wherein the starting synchronization point is stored on the destination server for use in the event of intentional or unintentional interruption.

29. The functional data of claim 18 further comprising deactivating the starting synchronization point after the target state specified by the source server for the destination server has been reached.

30. The functional data of claim 18 further comprising intentionally interrupting the incremental replication at the request of the source server after it is started.

31. The functional data of claim 30 further comprising continuing the incremental replication after the intentional interruption.

32. A state based database synchronization system for incremental replication of one or more changes made to at least one object in distributed databases, the state based database synchronization system having at least one source server initiating an incremental replication session with one or more destination servers, the system comprising means for:

determining, by the source server, a replication state of the destination server;

if the destination server has one previously established yet unsatisfied synchronization point, forming a starting synchronization point by:

extracting the unsatisfied synchronization point from the destination server;

identifying a type identifier within the extracted unsatisfied synchronization point which identifies a predetermined set of synchronization algorithms and an execution order thereof;

identifying a current key within the extracted unsatisfied synchronization point which indicates one of the predetermined set of synchronization algorithms to be started for execution; and adjusting a target state for the destination server to one older than or equal to an established target state specified by the extracted unsatisfied synchronization point, if the destination server has provided no synchronization point to the source server, generating a starting synchronization point by the source server indicating the corresponding type identifier, target state, and current key; and starting the incremental replication session according to the starting synchronization point, wherein the incremental replication session for the destination server is completed when the target state thereof is reached.

33. The system of claim 32 wherein each current key includes a first positioning element identifying one synchronization algorithm of the predetermined set of synchronization algorithms, and a second positioning element identifying one synchronization element of a set of synchronization elements corresponding to the synchronization algorithm identified by the first positioning element.

34. The system of claim 33 wherein the second positioning element identifies a sub-level current key, thereby forming a nested current key structure.

35. The system of claim 33 wherein each current key of the starting synchronization point sent to and saved on the destination server is updated as the synchronization elements are processed or the synchronization algorithms are executed during the incremental replication session.

36. The system of claim 33 further comprising means for constraining the use of the starting synchronization point by another source server if the synchronization elements on such another source server are in a different ordering.

37. The system of claim 33 wherein the synchronization elements are objects.

38. The system of claim 32 wherein the starting synchronization point further comprises one or more parameters indicating usage constraints.

39. The system of claim 38 wherein the parameters include at least one parameter based on which the source server or the destination server refuse to process the starting synchronization point.

40. The system of claim 32 wherein the target state is adjusted based on the current state of the destination server (DRS), the current state of the source server (SRS), and a configurable state window.

41. A method for incremental replication of one or more changes made to at least one partition in a state based distributed database synchronization system, the state based distributed database synchronization system having at least one source server initiating an incremental replication session with one or more destination servers, the method comprising:

determining, by the source server, a replication state of the destination server;

extracting an unsatisfied synchronization point from the destination server;

identifying a type identifier within the extracted unsatisfied synchronization point which identifies a predetermined set of synchronization algorithms and an execution order thereof;

identifying a current key within the extracted unsatisfied synchronization point which indicates one synchronization algorithm of the predetermined set of synchronization algorithms to be started for execution;

setting a target state for the destination server as specified by the extracted unsatisfied synchronization point, using the information extracted from the unsatisfied synchronization point of the destination server to form the starting synchronization point sending the synchronization point from the source server to the destination server;

requesting the destination server to start the incremental replication session based on the synchronization point; and implementing the incremental replication session on the destination server according to the synchronization point if the destination server does not refuse to accept the request, wherein the synchronization point uniquely identifies one or more synchronization algorithms and synchronization elements to be processed during the incremental replication session.

42. The method of claim 40 wherein each current key includes a first positioning element identifying one synchronization algorithm.

43. The method of claim 42 wherein each current key includes a second positioning element identifying at least one synchronization element corresponding to the synchronization algorithm identified by the first positioning element.

44. The method of claim 43 wherein the second positioning element identifies a sub-level current key, thereby forming a nested current key structure.

45. The method of claim 43 wherein the synchronization elements are one or more smallest data units for the synchronization commonly agreeable by both the source and destination servers.

46. The method of claim 41 further comprising updating each current key of the starting synchronization point sent to and saved on the destination server as the synchronization elements are processed or as the synchronization algorithms are executed during the incremental replication session.

47. The method of claim 41 further comprising constraining the use of the starting synchronization point by another source server if the another source server contains the synchronization elements in different ordering.

48. The method of claim 41 wherein the synchronization point further comprises one or more parameters indicating usage constraints.

49. The method of claim 48 wherein the parameters include at least one parameter based on which the source server or the destination server refuse to process the starting synchronization point.

50. The method of claim 41 wherein the target state is set based on the current state of the destination server (DRS), the current state of the source server (SRS), and a configurable state window.

51. The method of claim 41 further comprising deactivating the starting synchronization point after the target state specified by the source server for the destination server has been reached.

52. The method of claim 41 further comprising intentionally interrupting the incremental replication at the request of the source server after it is started.

53. The method of claim 41 further comprising, if the destination server provides no synchronization point to the source server, generating the starting synchronization point by the source server indicating the corresponding type identifier, target state, and current key.

* * * * *